United States Patent
Lee et al.

(10) Patent No.: US 7,349,040 B2
(45) Date of Patent: Mar. 25, 2008

(54) COMBINED BEZEL

(75) Inventors: Ming-Feng Lee, Tao Yuan Shien (TW); Hsiu-Hao Chen, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 374 days.

(21) Appl. No.: 11/108,820

(22) Filed: Apr. 19, 2005

(65) Prior Publication Data
US 2006/0066768 A1    Mar. 30, 2006

(30) Foreign Application Priority Data
Sep. 30, 2004   (TW) ............................... 93215546 U

(51) Int. Cl.
*G02F 1/1333*    (2006.01)

(52) U.S. Cl. ........................................ 349/58; 361/681

(58) Field of Classification Search .................. 349/58; 361/681
See application file for complete search history.

(56) References Cited

U.S. PATENT DOCUMENTS

| | | | |
|---|---|---|---|
| 7,142,264 B2 * | 11/2006 | Choi et al. ..................... | 349/58 |
| 2003/0011723 A1 * | 1/2003 | Ju ............................... | 349/58 |
| 2003/0147023 A1 * | 8/2003 | Kang et al. .................... | 349/58 |
| 2004/0201792 A1 * | 10/2004 | Saitoh et al. .................. | 349/58 |
| 2005/0018101 A1 * | 1/2005 | Choi et al. ..................... | 349/58 |
| 2005/0068469 A1 * | 3/2005 | Kim ............................. | 349/58 |
| 2006/0055839 A1 * | 3/2006 | Hirao et al. ................... | 349/58 |

* cited by examiner

*Primary Examiner*—David Nelms
*Assistant Examiner*—Thanh-Nhan P Nguyen
(74) *Attorney, Agent, or Firm*—Rabin & Berdo, PC

(57) ABSTRACT

A combined bezel for fixing a display panel module on the rear thereof is described. The combined bezel has a plurality of beams and a plurality of decorative corners. Each decorative corner couples to two adjacent beams to form a viewing area to expose a display area of the display panel module. The decorative corner further has a decorative pillar and two fixing wings. The two fixing wings fixed on the decorative pillar couples one crossbeam to one vertical beam and the decorative pillar is disposed between the crossbeam and the vertical beam to fill a gap therebetween.

17 Claims, 2 Drawing Sheets

COMBINED BEZEL

RELATED APPLICATIONS

The present application is based on, and claims priority from, Taiwan Application Serial Number 93215546, filed Sep. 30, 2004, the disclosure of which is hereby incorporated by reference herein in its entirety.

FIELD OF THE INVENTION

The present invention generally relates to a bezel for a flat panel display. More particularly, the present invention relates to a combined bezel for a flat panel display.

BACKGROUND OF THE INVENTION

Since the electronic industry and flat panel display manufacture technology have highly progressed, the quality of the flat panel display is enhanced but the price thereof is reduced. Now, the flat display panel widely applies to not only a personal computer but also a television for watching TV programs and enjoying multimedia entertainment. Therefore, the quantity and the size of the flat display panels gradually increase in the market.

A conventional 15" or 17" display panel for a personal computer is gradually being replaced by a larger display panel, such as the 19" or 21" display panel. In addition, the size of the flat display panel for a television also increases up quickly; for example, a 37" TFT-LCD (thin film transistor liquid crystal display) panel, and a 42" or a 63" plasma display panel, are gradually in use now.

Due to the size increase of the viewing area of the flat display panel, the shell thereof has to be enlarged simultaneously. A conventional flat display panel normally uses a one-shot molding to produce a plastic bezel thereof. Therefore, the dimensions of the mold of the bezel of the flat panel display are also increased. Accordingly, the mold cost of the bezel increases. In addition, the process parameters for injecting the large bezel have to be controlled more and more carefully. Otherwise, appearance defects may occur on the large bezel of the flat display panel, and the manufacturing cost of the flat display panel may increase due to a large amount of scrapped bezels.

SUMMARY OF THE INVENTION

It is an object of the present invention to provide a combined bezel to reduce effectively the mold cost of the flat panel display.

It is another object of the present invention to provide a decorative corner for supplying desired connection strength to bezel beams and improving the appearance of the bezel, so as to reduce the manufacturing cost of the flat panel display.

To accomplish the above objectives, the present invention provides a combined bezel for a flat panel display to expose a display area of the flat panel display. The combined bezel includes a plurality of beams and a plurality of decorative corners. Each decorative corner couples to two adjacent beams to form a viewing area exposing the display area of the flat panel display.

The combined bezel is preferably constructed from, for example, two vertical beams, two crossbeams, and four decorative corners. Each decorative corner couples one vertical beam to one crossbeam to form a rectangle viewing area. The decorative corner further includes a decorative pillar and two fixing wings. The two fixing wings are configured on two sides of the decorative pillar, one fixing wing couples to one vertical beam, and the other fixing wing couples to one crossbeam. The decorative pillar is configured between the coupled vertical beam and the coupled crossbeam to fill a gap therebetween.

The beams are preferably made of a shaped metal material, such as, for example, an aluminum extrusion material. The decorative corner can be made of a metal material or a plastic material. The combined bezel further includes a plurality of fixing devices, e.g. screws, to fix the beams on the decorative corner. The fixing devices preferably fix the beams on the decorative corners behind the decorative corners to avoid exposing the screws on the front of the combined bezel.

The combined bezel can effectively reduce the mold cost for manufacturing bezels of the flat panel display, and the combined bezel can be exactly coupled together to produce a beautiful appearance. Hence, the combined bezel according to the present invention can reduce the manufacturing cost of the bezel and effectively reduce the manufacturing cost of the flat panel display.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
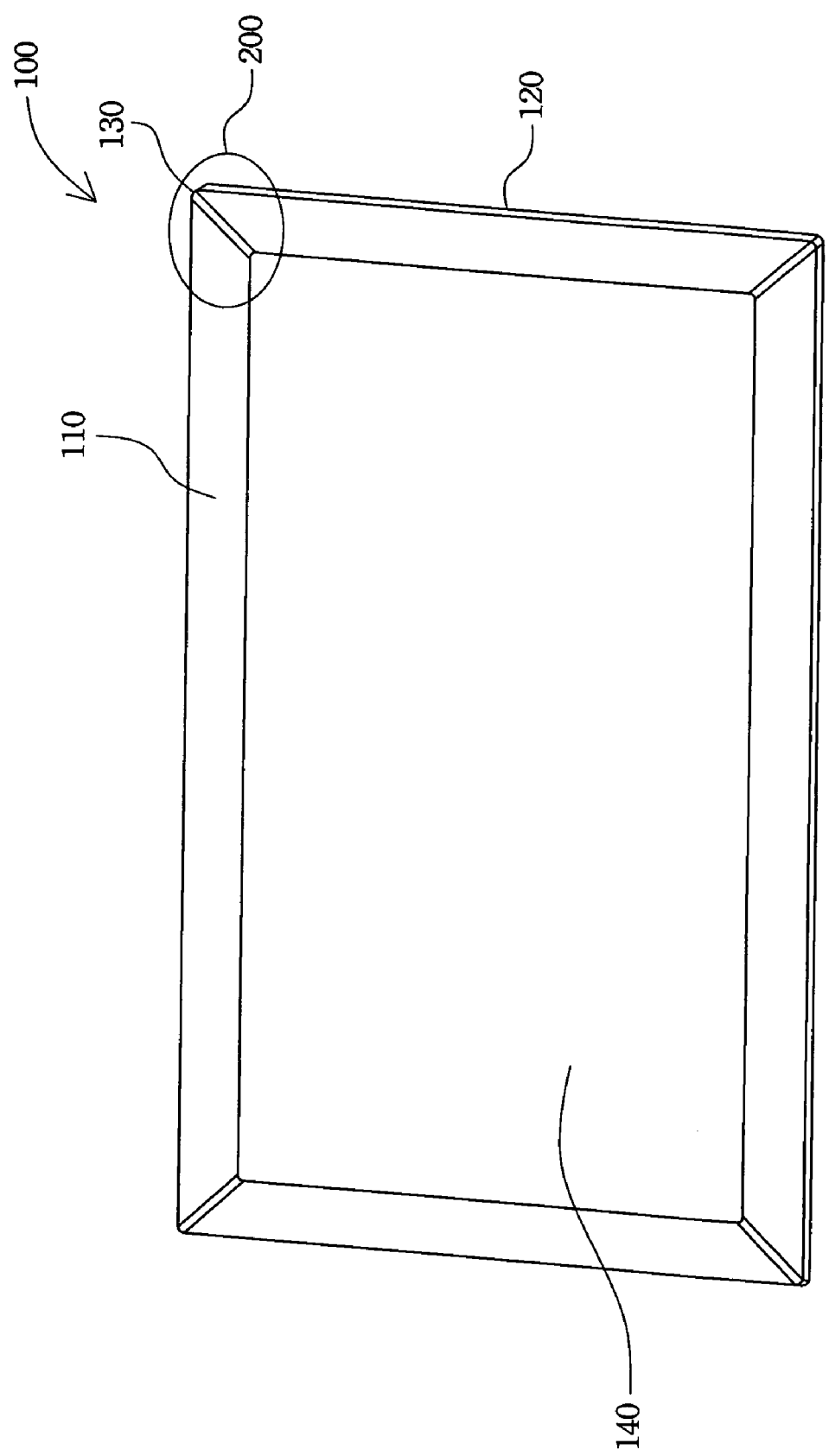
FIG. 1 is a preferred embodiment of a combined bezel according to the present invention.

FIG. 1 is a preferred embodiment of a combined bezel according to the present invention. Referring to FIG. 1, the combined bezel 100 includes a plurality of beams 110, 120 and decorative corners 130. In the preferred embodiment, the beam 110 is a crossbeam of the bezel of the flat display panel and the beam 120 is a vertical beam thereof. The beams 110, 120 and the decorative corners 130 construct the combined bezel 100 and form a viewing area 140 in the central portion of the combined bezel 100. After the display panel module is installed behind the combined bezel 100, the display panel module can demonstrate the image through the viewing area 140.

Figure 2:
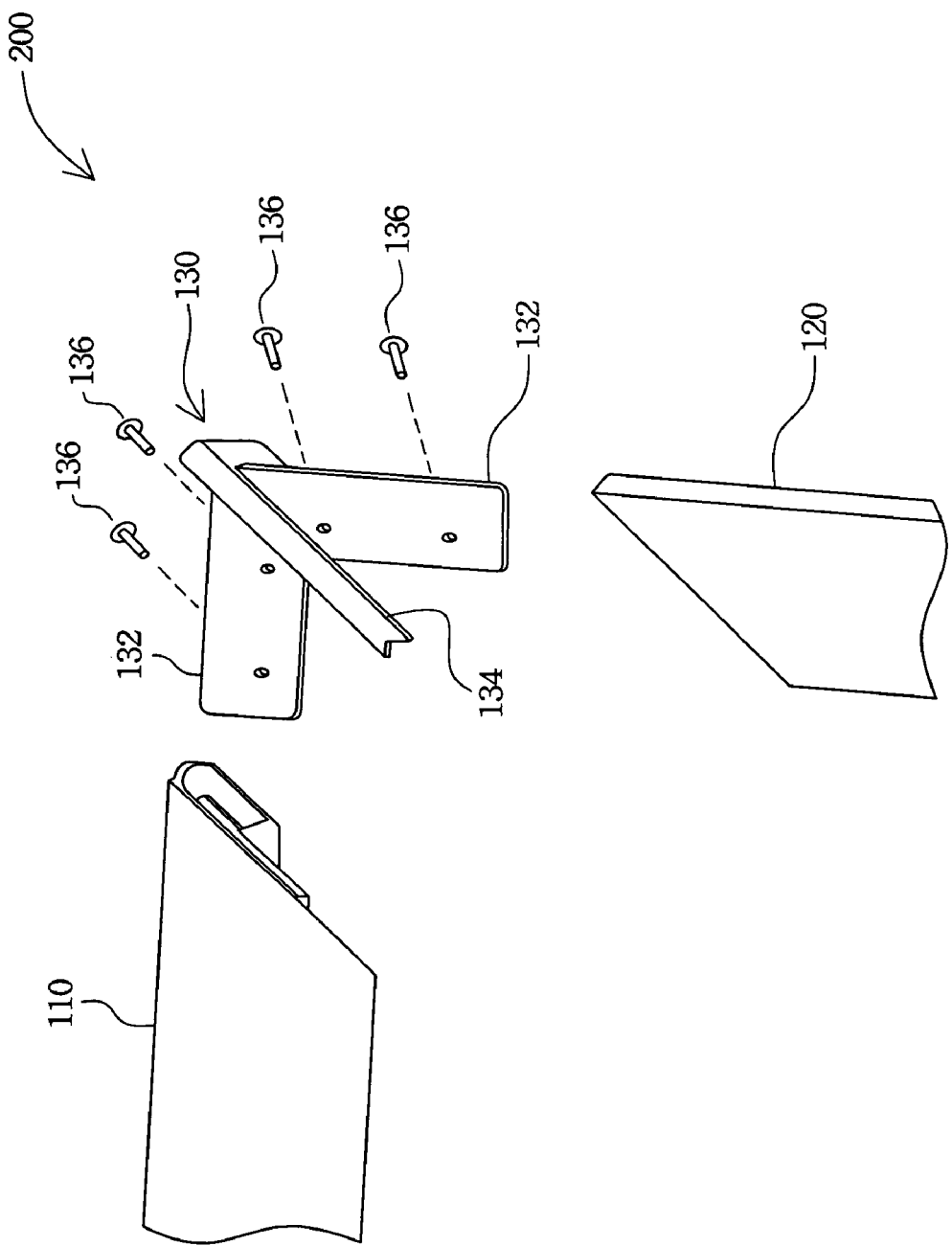
FIG. 2 is an enlarged partial exploded view of FIG. 1.

Simultaneously referring to FIG. 2 and FIG. 1, FIG. 2 illustrates a partially enlarged exploded view of FIG. 1. Referring to a corner portion 200 of FIG. 2, the corner portion 200 includes the decorative corner 130 coupling to the beam 110 and the beam 120 with fixing wings 132. In addition, the beam 110 and the beam 120 are fixed on the decorative corner 130 by fixing devices 136 from the rear side thereof. The decorative corner 130 further includes a decorative pillar 134 disposed between the fixing wings 132 for fixing the fixing wings 132 thereon. The decorative pillar 134 can enhance the connection strength of the fixing wings 132 and fill a gap between the beam 110 and the beam 120, which results from different sizes of flat display panels. The present decorative corner 130 not only effectively couples to the beam 110 and the beam 120 but also provides a beautiful appearance for the beam 110 and the beam 120 so as to further beautify the combined bezel. The fixing device 136 fixes the beams 110, 120 from the rear side of the decorative corner 130 preserve the appearance of the combined bezel from damaging the bezel surface so the combined bezel can fit the flat panel display and reduce the manufacturing cost thereof.

The beams 110, 120 are, for example, aluminum extrusion crossbeams or vertical beams, or plastic crossbeams or vertical beams. The decorative corner 130 can made of plastic material or metal material. The mold cost of the aluminum extrusion beam and the decorative corner 130 is much lower than the cost of the injection mold of the conventional bezel of the flat panel display. The decorative corner 130 couples to the crossbeams and the vertical beams to form the bezel of the flat panel display, eliminates the gap between the crossbeams and the vertical beams, and further provides a suitable connection strength to the crossbeams and the vertical beams. Hence, the combined bezel according to the present invention can reduce the manufacturing cost of the bezel of the large flat panel display and beautify the appearance thereof so as to reduce further the manufacturing cost of the flat panel display.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A combined bezel for a flat display panel with a display area, the combined bezel comprising:
   a plurality of beams comprising two vertical beams and two crossbeams; and
   a plurality of decorative corners, each of the decorative corners coupling adjacent ones of the beams to form a viewing area for exposing the display area of the flat display panel, wherein the decorative corners further comprise a decorative pillar and two fixing wings disposed on two sides of the decorative pillar, and one of the fixing wings couples to one of the two vertical beams, another fixing wing of the two fixing wings couples to one of the two crossbeams, and the decorative pillar is coupled between the coupled vertical beam and the coupled crossbeam to fill a gap therebetween.

2. The combined bezel of claim 1, wherein a quantity of the decorative corners is four and the four decorative corners couple the vertical beams to the crossbeams to form a rectangle viewing area.

3. The combined bezel of claim 1, wherein the beams are made of a shaped metal material.

4. The combined bezel of claim 3, wherein the shaped metal material is an aluminum extrusion material.

5. The combined bezel of claim 1, wherein the decorative corner is made of a metal material.

6. The combined bezel of claim 1, wherein the decorative corner is made of a plastic material.

7. The combined bezel of claim 1, wherein the combined bezel further comprises a plurality of fixing devices to fix the beams and the decorative corner.

8. The combined bezel of claim 7, wherein the fixing devices comprise screws.

9. The combined bezel of claim 8, wherein the screws fix the beams on the decorative corners behind the decorative corners to avoid exposing the screws in front of the combined bezel.

10. A combined bezel configured in front of a display panel module with a display area, the combined bezel comprising:
    two vertical beams parallel to each other;
    two crossbeams, parallel to each other and perpendicular to the vertical beams; and
    four decorative corners, each of the decorative corners coupling one of the vertical beams to one of the crossbeams to form a viewing area for exposing the display area of the display panel module, wherein the decorative corners further comprise:
    a decorative pillar; and
    two fixing wings disposed on two sides of the decorative pillar, wherein one of the fixing wings couples to one of the two vertical beams, another fixing wing of the two fixing wings couples to one of the two crossbeams, and the decorative pillar is coupled between the coupled vertical beam and the coupled crossbeam to fill a gap therebetween.

11. The combined bezel of claim 10, wherein the vertical beams and the crossbeams are made of a shaped metal material.

12. The combined bezel of claim 11, wherein the shaped metal material is an aluminum extrusion material.

13. The combined bezel of claim 10, wherein the decorative corner is made of a metal material.

14. The combined bezel of claim 10, wherein the decorative corner is made of a plastic material.

15. The combined bezel of claim 10, wherein the combined bezel further comprises a plurality of fixing devices to fix the vertical beams and the crossbeams on the decorative corner.

16. The combined bezel of claim 15, wherein the fixing devices comprise screws.

17. The combined bezel of claim 16, wherein the screws fix the beams on the decorative corners behind the decorative corners to avoid exposing the screws in front of the combined bezel.

* * * * *